(12) United States Patent
Taneko

(10) Patent No.: US 6,470,157 B2
(45) Date of Patent: Oct. 22, 2002

(54) IMAGE FORMING APPARATUS

(75) Inventor: Takashi Taneko, Tochigi (JP)

(73) Assignee: Matsushita Graphic Communication Systems, Inc., Tokyo (JP)

( * ) Notice: Subject to any disclaimer, the term of this patent is extended or adjusted under 35 U.S.C. 154(b) by 0 days.

(21) Appl. No.: 09/948,606

(22) Filed: Sep. 10, 2001

(65) Prior Publication Data
US 2002/0076232 A1 Jun. 20, 2002

(30) Foreign Application Priority Data
Dec. 15, 2000 (JP) ........................................ 2000-381894

(51) Int. Cl.[7] .............................................. G03G 15/00
(52) U.S. Cl. ........................................................ 399/88
(58) Field of Search ................................ 399/88, 75, 37, 399/9, 91

(56) References Cited

U.S. PATENT DOCUMENTS

| 5,293,196 | A | * | 3/1994 | Kaneko et al. ................ 399/88 |
| 5,862,437 | A | * | 1/1999 | Kutsuwada et al. .......... 399/37 |
| 6,134,401 | A | * | 10/2000 | Yun et al. ...................... 399/37 |
| 6,298,202 | B1 | | 10/2001 | Fushiya | |
| 6,371,471 | B1 | * | 4/2002 | Fukazu et al. ................ 399/88 |
| 6,405,001 | B1 | * | 6/2002 | Sumiyoshi .................... 399/88 |
| 6,408,149 | B1 | * | 6/2002 | Taira et al. .................... 399/88 |

* cited by examiner

Primary Examiner—Susan S. Y. Lee
(74) Attorney, Agent, or Firm—Greenblum & Bernstein, P.L.C.

(57) ABSTRACT

An image forming apparatus is provided including a power supply that supplies an electric power equal to or less than a predetermined amount of the electric power, a first function that is a process before a printed paper is obtained and uses a first electric power, a second function that is a process performed after the printed paper is obtained and uses a second electric power, and a controller. When the first function and the second function are instructed to be processed in parallel, the controller compares a sum of the first electric power and the second electric power with the predetermined amount of the electric power. When the sum of the first electric power and the second electric power exceeds the predetermined amount of the electric power, the controller delays one of the first function and the second function.

7 Claims, 10 Drawing Sheets

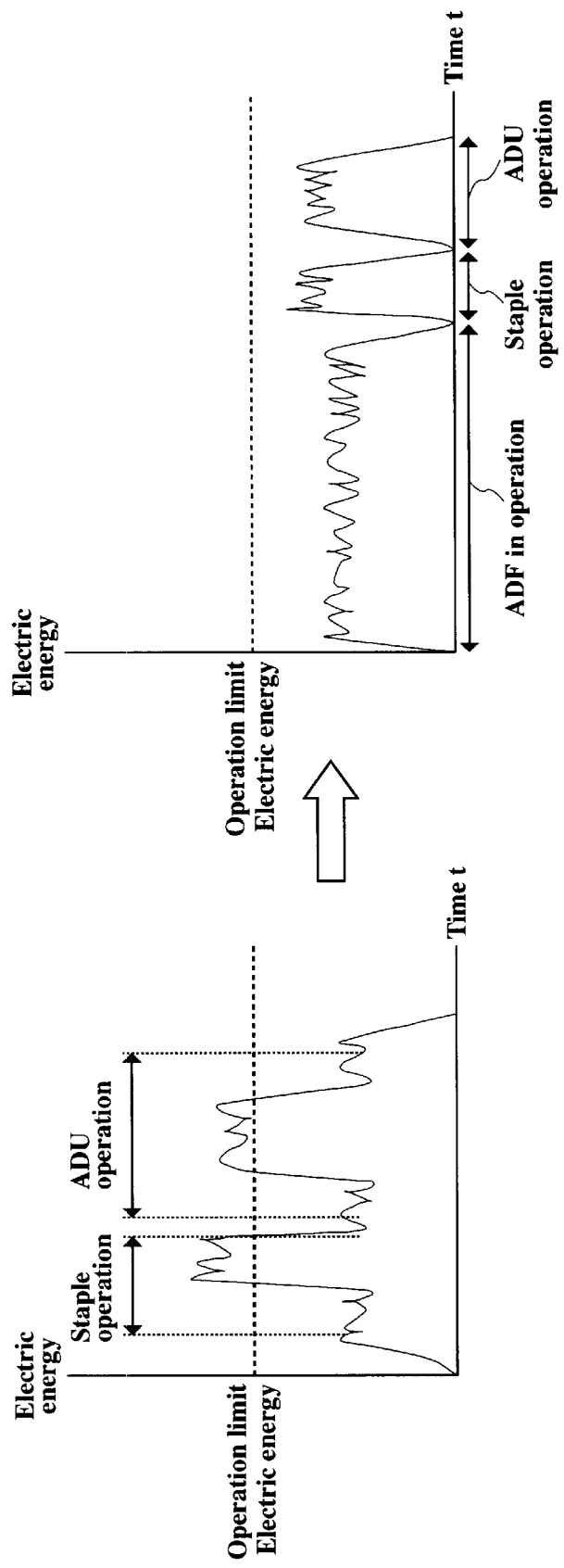

IMAGE FORMING APPARATUS

BACKGROUND OF THE INVENTION

1. Field of the Invention

The present invention relates to an image forming apparatus, which records images on a recording paper, such as a copying machine, a facsimile machine, a printer and a multifunctional machine, which integrates functions of these apparatuses.

2. Description of Background Information

Conventionally, a copying machine, a facsimile machine, a printer and a multifunctional machine, which is a copying machine to which a facsimile function and/or a printer function are/is added (hereinafter, referred to as "image forming apparatus" in general) are provided with a power supply having a predetermined electric capacity, and an electric power used by each function is determined so that various functions can be executed within the predetermined electric power capacity of the power supply.

However, in the conventional technology, there are problems as described below. Recently, the number of functions requested for the image forming apparatus mentioned above is increased. In addition, it is often required that plural functions are processed in parallel.

For example, in a copying machine, a sophisticated (multifunctional) copying machine is realized, in which an automatic document feeding function (hereinafter, referred to as "ADF operation"), which feeds an original from an original document holder, passes the original over a platen glass and conducts the original toward a dispatcher, a double-sided recording paper feeding function (hereinafter, referred to as "ADU operation"), which feeds a recording paper automatically turned over to perform double-sided recording, and a staple function, which automatically staples recorded papers in the apparatus.

In a facsimile machine, an ADF function, a broadcast function, a time programmed transmission/reception function and an Internet function are added in addition to a transmission/reception function.

In a printer, a high speed (acceleration) function, a USB function and a wireless driving function are added.

In a multifunctional machine, all of the above-described functions are integrated or selectively added. Further, a color recording function is added to all the above-described image forming apparatuses.

Thus, the progress of multifunctionality and sophistication of functions increase an electric power required for the image forming apparatus. Further, when simultaneous use of plural functions are requested, the electric power larger than the predetermined capacity of the electric power supply of the machine is required. Accordingly, to respond to the requirement, the capacity of the electric power supply of the machine is usually increased.

However, an electric power supplied by an electrical outlet provided at an office or a usual home has an upper limit. Therefore, there is a limit to increase an electric capacity of the power supply of the machine. When the electric capacity of the machine exceeds the limit, a separately provided special power supply is required to fulfill the requirement. In this case, a user must purchase a dedicated power supply in addition to the machine itself. As a result, it becomes a problem that the user is forced to have more than necessary economic burden and to prepare a space for installation.

SUMMARY OF THE INVENTION

Accordingly, the object of the present invention is to provide an image forming apparatus that can realize a priority process and a parallel (concurrent) process of requested plural functions without increasing an electric source capacity of the apparatus, and without increasing user's economic burden, even when the requested functions are increased and plural functions are requested to be processed in parallel (concurrently).

Image forming equipment of the present invention comprises a power supply with preset upper limit of electric energy that supplies electric power to the equipment, the first function that operates on the first electric energy, and the second function that operates on the second electric energy wherein, at the request of parallel processing of the first function and the second function, either the first function or the second function is processed in priority when total of the electric energy required by the first function and the second function exceeds the upper limit capacity of the power supply and they are processed in parallel when the total energy does not exceed the upper limit capacity.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIGS. 10(a) and (b) are diagrams of waveform for illustrating effects of a priority process function of the image forming apparatus of the present invention.

DETAILED DESCRIPTION OF PREFERRED EMBODIMENTS

Hereinafter, preferred embodiments are described in detail using drawings.

Figure 1:
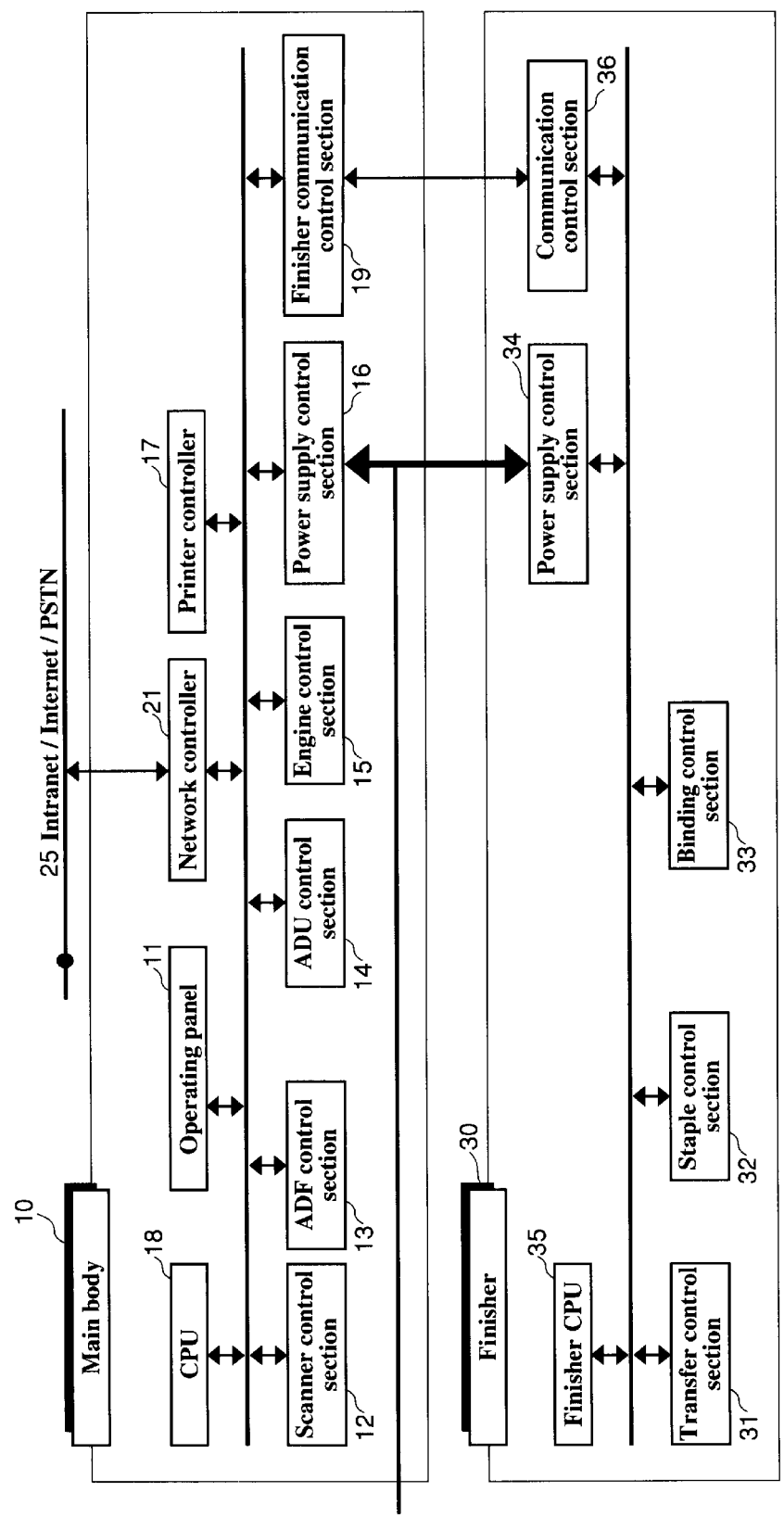
FIG. 1 is a schematic block diagram showing entire configuration of an image forming apparatus of the present invention.

FIG. 1 is a schematic block diagram of image forming apparatus of the present invention. The image forming apparatus includes a main body section 10 that forms an image and a finisher section 30 that processes a recording medium, such as a recording paper, on which an image is formed.

The main body section 10 includes an operating panel 11 through which an operation of the apparatus is instructed/input, a scanner control section 12 that scans an original to be copied or transmitted, an ADF control section 13 that controls an ADF operation unit, which automatically feeds (conveys) originals, an ADU control section 14 that controls an ADU operation unit that conveys a (double-sided) recording paper for double-sided coping, an engine control section 15 that controls each part (component) of the main body section 10 according to an operation on the operating panel 11, a power supply control section 16 that controls an operation mode of the power supply of the main body section 10, a printer controller 17 that controls a printer section, a CPU 18 that controls entire the operation, and a finisher communication control section 19 that communicates information with the finisher 30.

The main body section 10 further comprises a network controller 21 that controls connection between the main body section 10 and a network 25, such as Intranet, Internet and a public service telephone network. These networks are used for transmitting image data read (scanned) by the scanner control section 12, for storing image data transmitted (received) via the network 25 in a memory, which is not shown in the figure, and for printing the image data by the printer section.

The finisher section 30 includes a transfer control section 31 that conveys a recording medium, such as a recording paper, to a copy position and further to a dispatcher position, a staple control section 32 that controls stapling of recording media by a stapler, a binding control section 33 that controls folding and collating of the recording media when recording media are bound, a power supply control section 34 that controls an operation mode of the power supply of the finisher section 30, a finisher CPU 35 that controls entire the finisher section 30, and a communication control section 36 that controls communication with the main body section 10.

Figure 2:
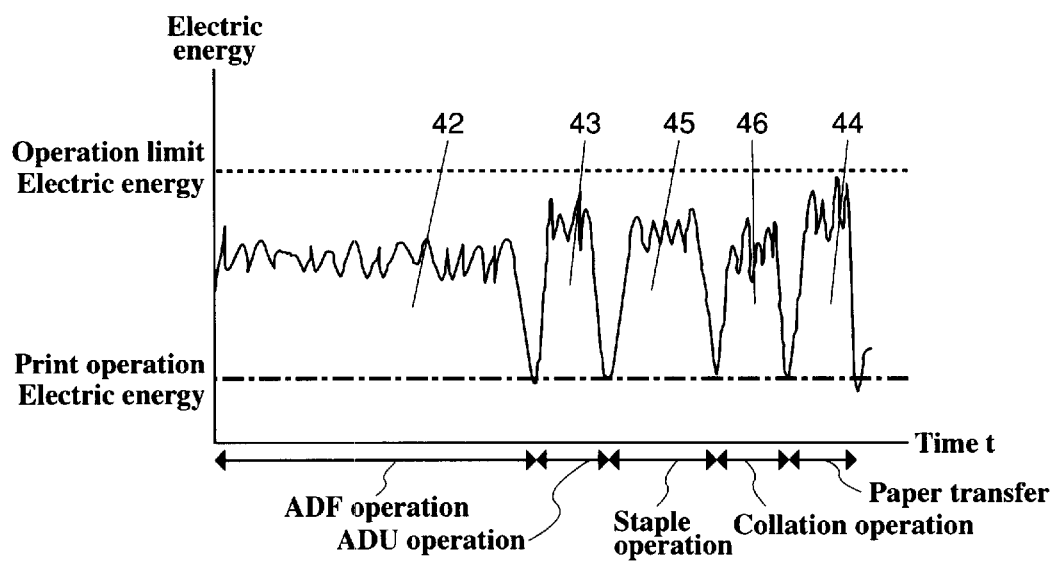
FIGS. 2(a) and 2(b) are diagrams showing waveforms of electric power used in functions/operations of the image forming apparatus of the present invention.
Figure 2:
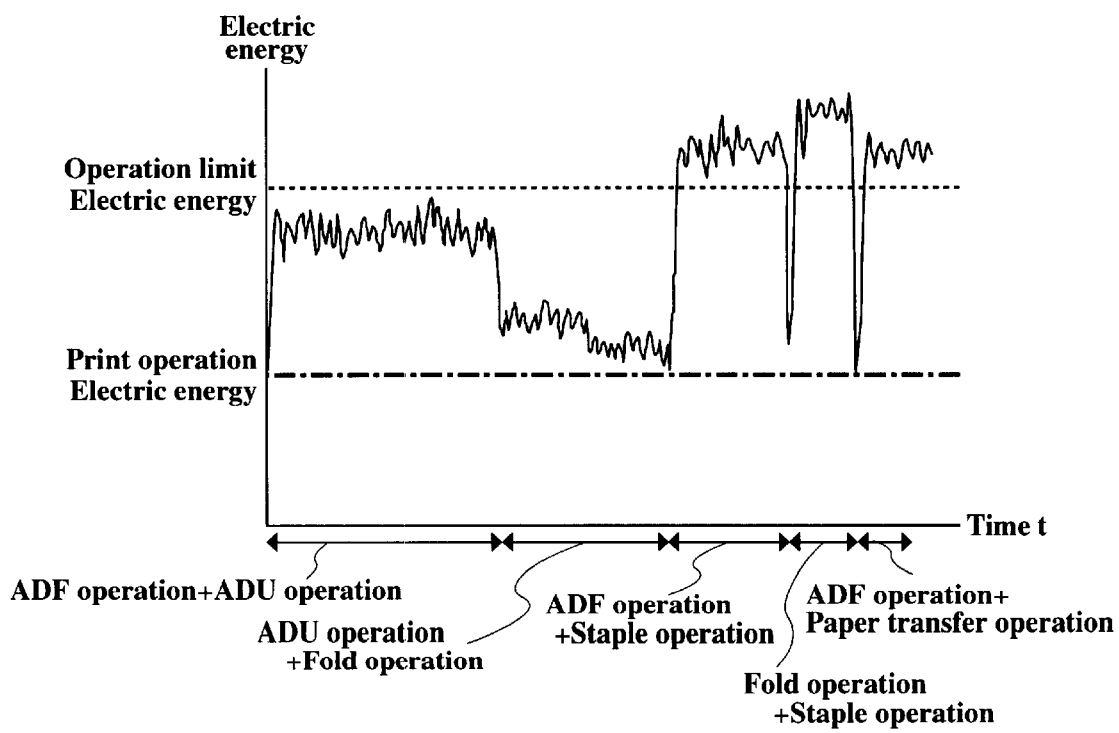

The power supply control section 16 of the main body section 10 and the power supply control section 34 control (manage) electric power consumption thereof depending upon respective operations/functions and detect (determine) whether, as shown in FIGS. 2(*a*) and 2(*b*), the sum of the power consumption exceeds an operation limit electric power 40, which is preset as a specification of the apparatus. In the present embodiment, as shown in FIG. 2(*a*), it is designed that the total power consumption does not exceed the operation limit electric power 40, when one of the power consumption 42 of the ADF operation, the power consumption 43 of the ADU operation, the power consumption 44 of paper dispatch at the finisher, the power consumption 45 of the staple operation and the power consumption 46 of folding operation is added to the power consumption 41 of the print operation. However, as shown in FIG. 2(*b*), the total power consumption exceeds the operation limit electric power 40, when more than two operations mentioned above are added, except for the case in which the ADF operation and the ADU operation are simultaneously added, or the ADU operation and the folding operation are simultaneously added.

Next, an operation of the image forming apparatus of the present embodiment is described.

First, an operation condition is input from the operation panel 11. The CPU 18 gives the input condition to the scanner control section 12, the ADF control section 13, the ADU control section 14, the engine control section 15, the power supply control section 16, the printer controller 17, and the finisher communication control section 19.

The engine control section 15 determines whether a print operation, such as copying, should be started or not at the step (hereinafter, referred to as "S") 1 in the main body operation control flow shown in FIG. 3. When the print operation is not to be started, the main body section 10 does not operate and goes to the waiting status. When the print operation is to be started, the ADF control section 13 decides whether an automatic (original) document feeding is used. In other words, it is determined whether an ADF operation is used in S2. When the ADF operation is used, the ADF control section 13 inquires an electric power consumption of the ADF operation in S3, and determines in S4, whether the electric power consumption is under the allowed electric power limit capacity of the apparatus, when the ADF operation is used to decide whether the ADF operation will be permitted. When the ADF operation is not used in S2, the control proceeds to S5 described later.

Figure 4:
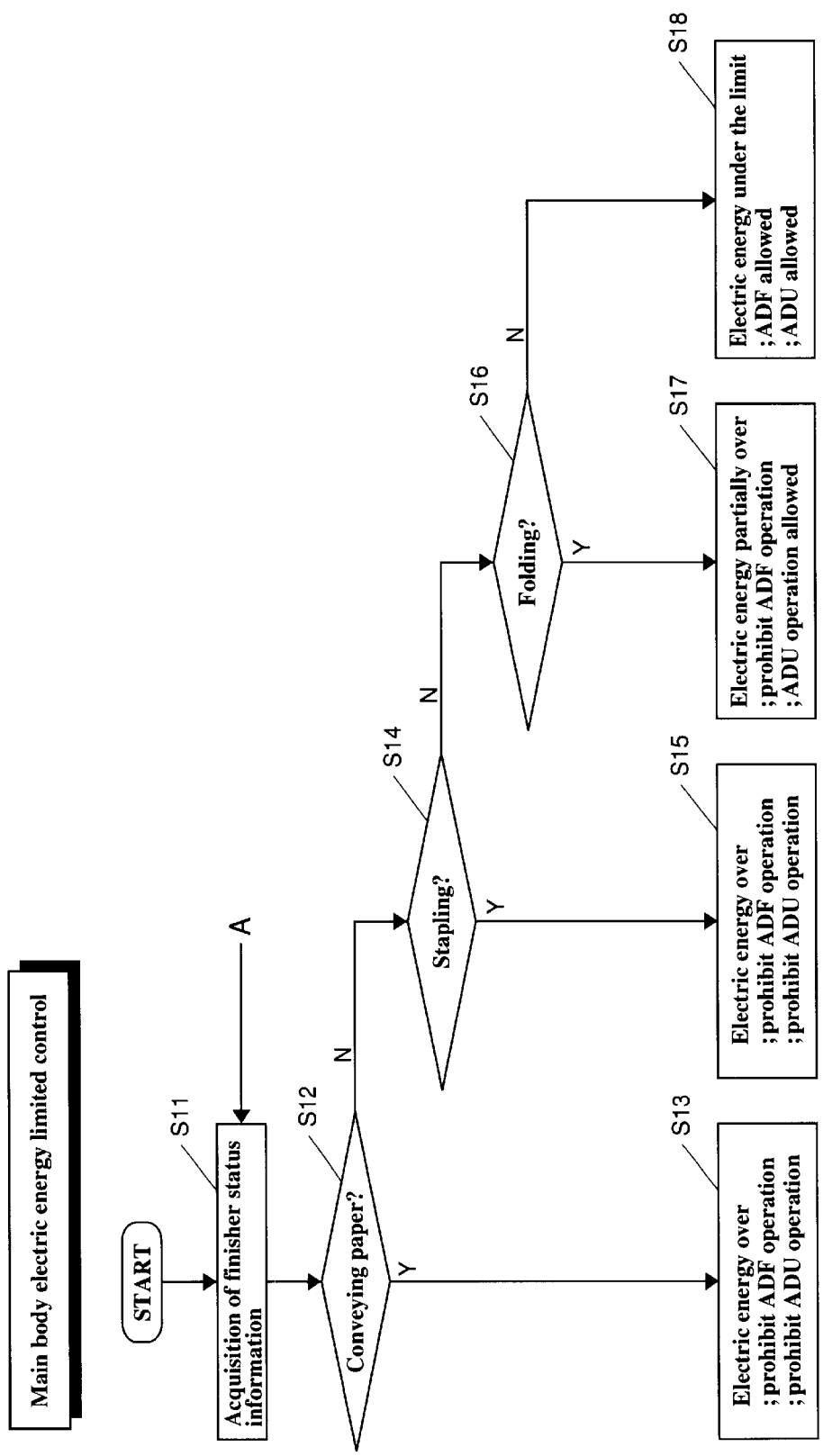
FIG. 4 is a flowchart illustrating an operation of an electric power control section of the main body section of the image forming apparatus of the present invention.

In S3, the ADF control section 13 inquires the electric power consumption of the ADF operation in S3 of the finisher 30 via the finisher communication control section 19, and obtains status information of the finisher 30 from the finisher 30 in S11 shown in FIG. 4.

Figure 5:
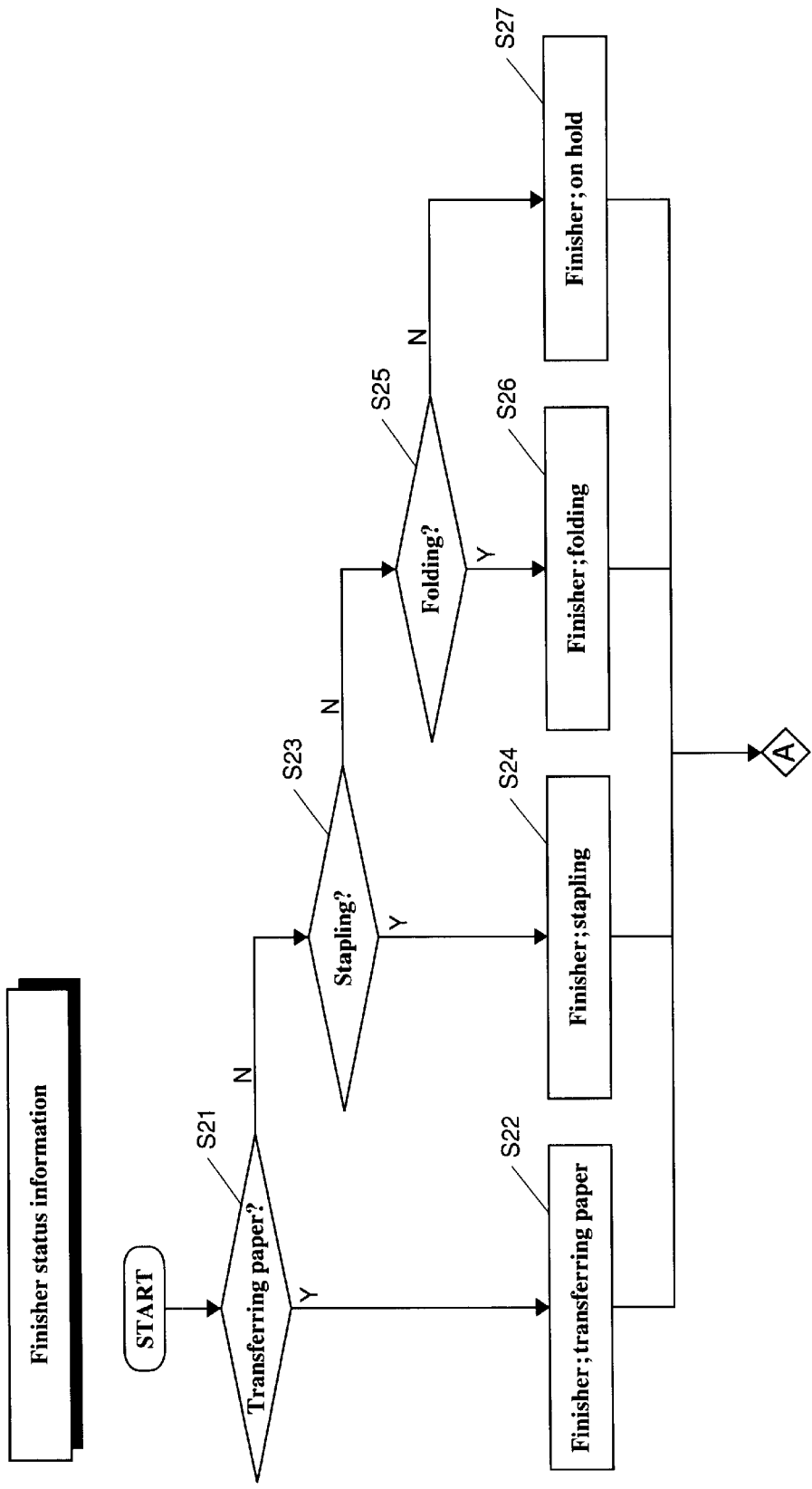
FIG. 5 is a flowchart illustrating a status generating operation of a finisher section in the image forming apparatus of the present invention.

An operation for detecting statuses of the finisher 30 is shown in FIG. 5. In the finisher 30, the finisher CPU 35 determines in S21 whether the transfer control section 31 is conveying a paper. When the paper is being conveyed, paper conveying information is output to the finisher CPU 35 in S22. When the paper is not conveyed in S21, it is determined in S23 whether the staple control section 32 is stapling. When the stapling is performed, the stapling information is output to the finisher CPU 35 in S24. When stapling is not performed in S23, then it is determined in S25 whether the binding control section 33 is folding papers. When folding is performed, folding operation information is output to the finisher CPU 35 in S26. When the folding operation is not performed in S25, finisher on-hold information is output to the finisher CPU 35 in S27.

In S11 of FIG. 4, the finisher CPU 35 sends one of the paper conveying information S22, the stapling information S24, the folding operation information S26 and the finisher on-hold information S27 to the CPU 18 as information "A" shown in FIG. 4 via the communication control section 36 of the finisher section 30 and the finisher communication control section 19 of the main body section 10.

The CPU 18 determines in S12 whether the information "A" is the paper conveying information. When it is the paper conveying information, the CPU 18 sends, in S13, the information indicating that the electric power consumption will exceed the limit if the ADF operation is performed in S3 of FIG. 3. When the paper conveying operation is not being performed in S12, it is determined whether stapling operation is being performed. When the stapling operation is being performed, the CPU 18 sends, in S15, information indicating that the electric power will exceed the limit, to S3 of FIG. 3. When the stapling operation is not being performed in S14, it is determined whether the folding operation is being performed in S16. When the folding operation is being performed, the CPU 18 sends, in S17, electric power partial overload information indicating that the ADU operation is allowed but the ADF operation is not allowed, to S3 of FIG. 3. When the folding operation is not being performed in S16, the CPU 18 sends, in S18, information indicating that the electric power will not exceed the limit.

Figure 3:
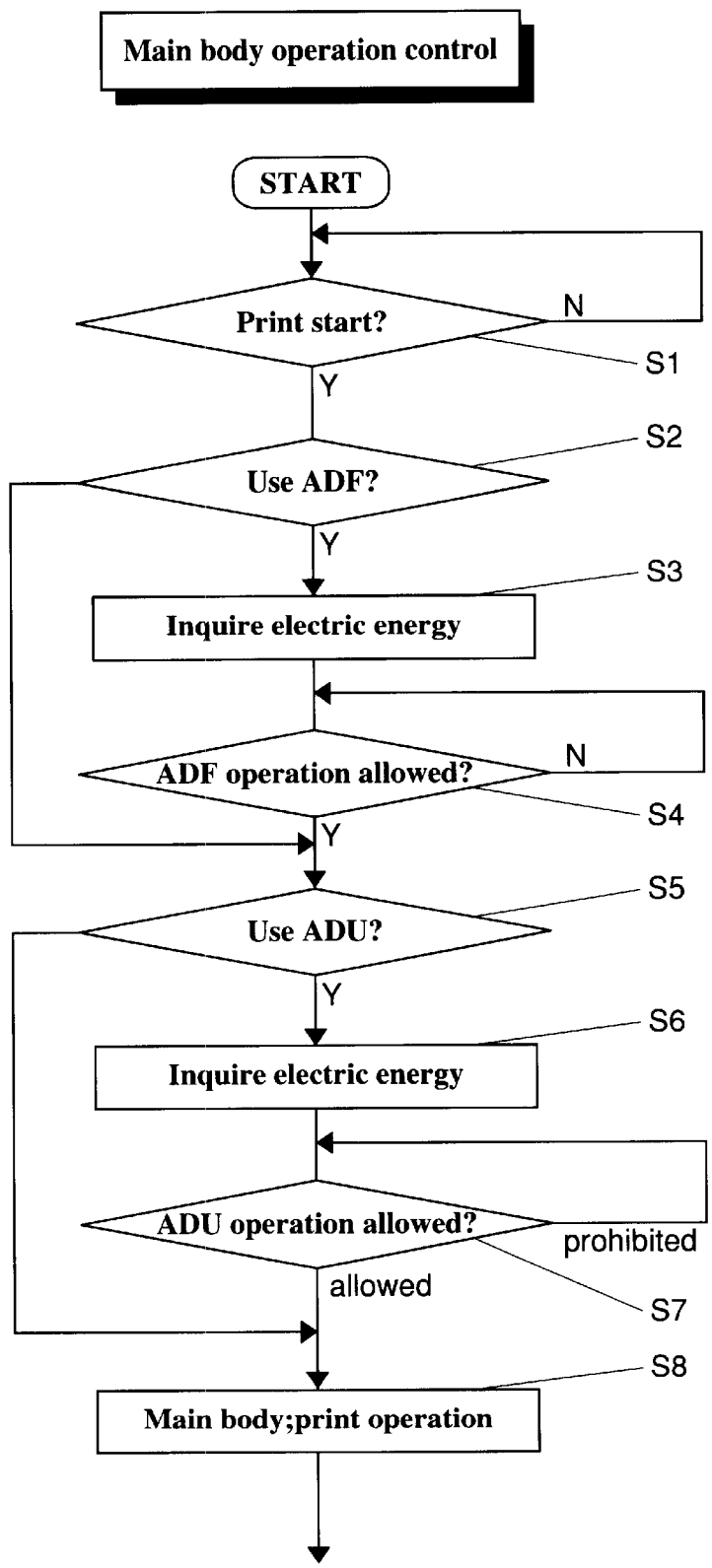
FIG. 3 is a flowchart illustrating an operation of a main body section of the image forming equipment of the present invention.

The operation returns to FIG. 3. When any information described above is received in S3 of FIG. 3, the CPU 18 determines, in S4, whether the ADF operation is allowed or not. If the ADF operation is not allowed, the CPU 18 notifies the prohibition to the power supply control section 16 and holds the ADF operation until any of other operations finishes and the ADF operation becomes allowed. When the ADF operation is allowed, the power supply control section 16 notifies the allowance of the ADF operation to the ADF control section 13 and the ADF operation starts. Originals are scanned according to the control of the scanner control section 12 and the scanned original data are stored in the memory that is not shown in the figure.

Next, it is determined whether the ADU operation is used in S5. When the ADU operation is used, inquiry of the electric energy is performed in S6. The electric power inquiry is performed according to the same procedure as described in FIG. 4. After that, it is determined whether the ADU operation is allowed, in S7. When the ADU operation is prohibited, the CPU 18 notifies the prohibition to the power supply control section 16 and holds the ADU operation until any of other operations finishes and the ADU operation becomes allowed. When the ADU operation is allowed in S7, the power supply control section 16 notifies the allowability of the ADU operation to the ADU control section 14 and the ADU operation starts.

Next, in S8, the CPU 18 controls the engine control section 15 and the printer controller 17 to start a print operation. When the ADU operation is not used in S5, the control immediately proceeds to S8.

Figure 6:
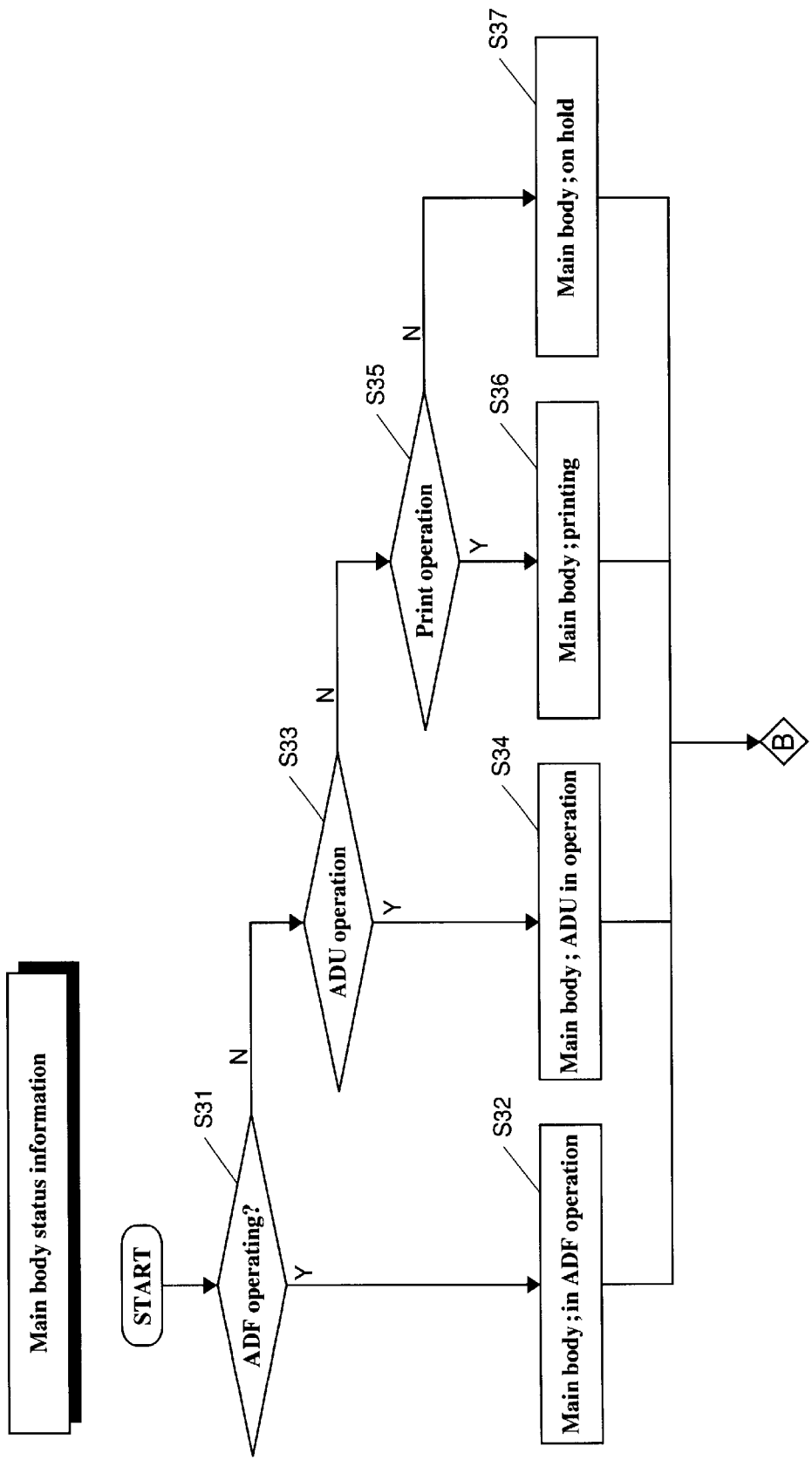
FIG. 6 is a flowchart illustrating a status generating operation of the main body section status in the image forming apparatus of the present invention.

FIG. 6 is a flowchart illustrating information generating operation in which operation status information of the main body 10 is sent from the finisher communication control section 19 to the communication control section 36 of the finisher section 30. In S31, the main body section 10 determines whether the ADF operation is being performed. When the ADF operation is being performed, the ADF in-operation information is created. When the ADF is not being performed, the main body section 10 determines whether the ADU operation is being performed or not. When the ADU operation is being performed, the ADU in-operation information is created in S34.

Figure 8:
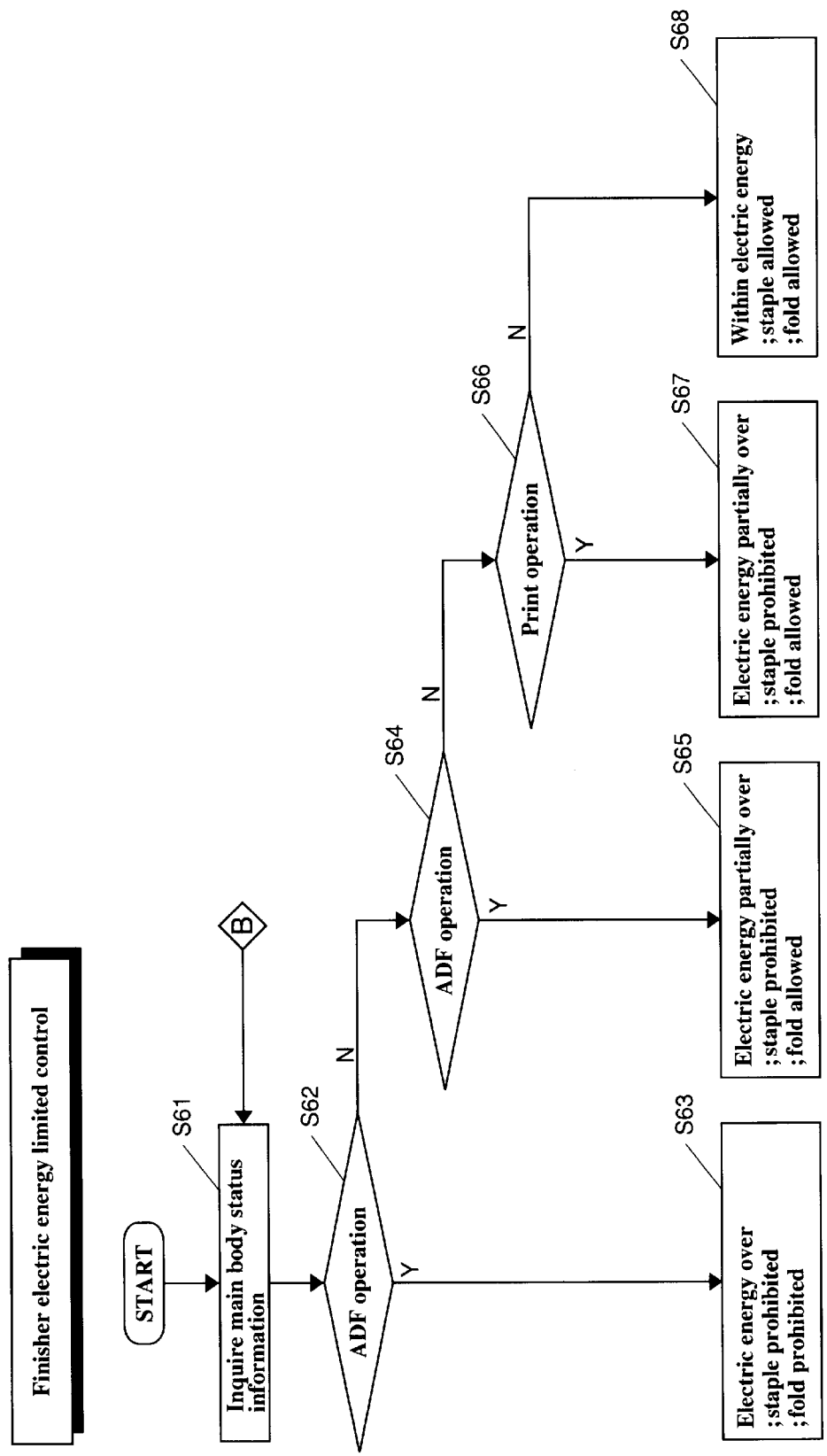
FIG. 8 is a flowchart illustrating an operation of electric power control of the finisher section of the image forming apparatus of the present invention.

When the ADU operation is not being performed, it is determined whether the print operation is being performed in S35. When the print operation is being performed, print in-operation information is created in S36. When the print operation is not being performed, main body on-hold information is created in S37. These kinds of information described above are provided to the CPU 35 of the finisher section 30 from the finisher communication control section 36 as information "B" as shown in FIG. 8, which is described later.

Figure 7:
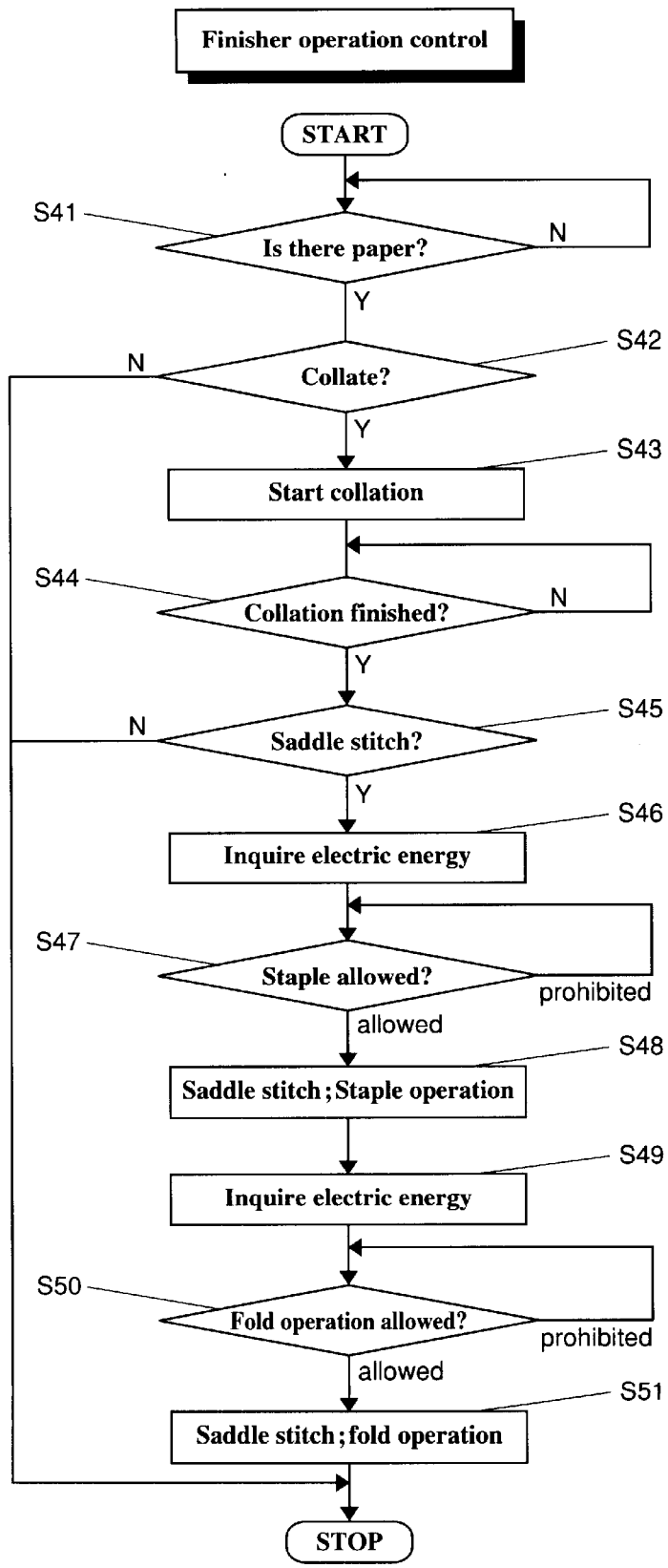
FIG. 7 is a flowchart illustrating an operation of control of the finisher section of the image forming apparatus of the present invention.

Next, an operation of the finisher section 30 is described. FIG. 7 is a flowchart describing the operation of the finisher section 30. In the embodiment shown in FIG. 7, a saddle stitch operation including a staple operation and a folding operation is explained.

First, it is determined whether there are copied papers in S41. When there are copied papers, the control of the finisher section 30 goes to S42. When there are not copied papers, the finisher section 30 stands by (holds further processes). It is determined whether the collating of copied papers is necessary in S42. When collating is necessary, the control proceeds to S43 and collating operation starts. When collating is not necessary, papers are output and the finisher ends operation.

In S44, it is determined whether collation of copied papers is completed. When completed, it is determined whether the saddle stitch is necessary in S45. When collation is not completed in S44, the finisher section 30 waits until the completion. When the saddle stitch is not necessary in S45, the finisher section 30 ends operation.

When the saddle stitch is necessary in S45, electric power necessary for stapling is inquired in S46. The procedure of inquiry is shown in FIG. 8. First, the status information of the main body section 10 is acquired in S61. The status information of the main body section 10 is the information described in FIG. 6 and acquired as information "B". Based on this information "B", it is determined whether the ADF is operating at the main body section 10 in S62. When the ADF operation is being performed, electric power over-limit information, in other words, information to prohibit the staple operation and the folding operation is created.

When the ADF is not operating in S62, it is determined whether the main body section is operating the ADU operation. When the ADU operation is in operation, an electric power partial over-limit information, in other words, information prohibiting the staple operation but allowing the folding operation is created in S65. When the ADU is not being performed in S64, it is determined whether the main body section 10 is performing the print operation in S66. When the print operation is being performed, an electric power partial over-limit information, in other words, information prohibiting the staple operation but allowing the folding operation is created in S67. When the print operation is not in operation in S66, the finisher section 30 creates an electric power under-limit information indicating that there is enough electric power to be used, in other words, information allowing the staple operation and the folding operation.

Thus, depending on the operation status of the main body 10, one of the information mentioned above is sent, as a reply for the inquiry in S46, to the CPU 35 and the power supply control section 34. In S47, it is determined whether the staple operation is allowed based upon the received information. When the stapling is allowed, the staple operation is performed in S48.

Next, electric power necessary for the folding operation is inquired in S49. The procedure of the inquiry is the same as that described in FIG. 8. The status information of the main body section 10 is notified to CPU 35 and the power supply control section 34 depending on the operation status of the main body section 10. Based on the notified information, it is determined whether the folding operation is allowed in S50. When the folding operation is allowed, the folding operation is executed in S51. When the folding operation is not allowed, the folding operation is held (stopped) until any of operations of the main body section 10 ends and the folding operation is allowed.

Figure 9:
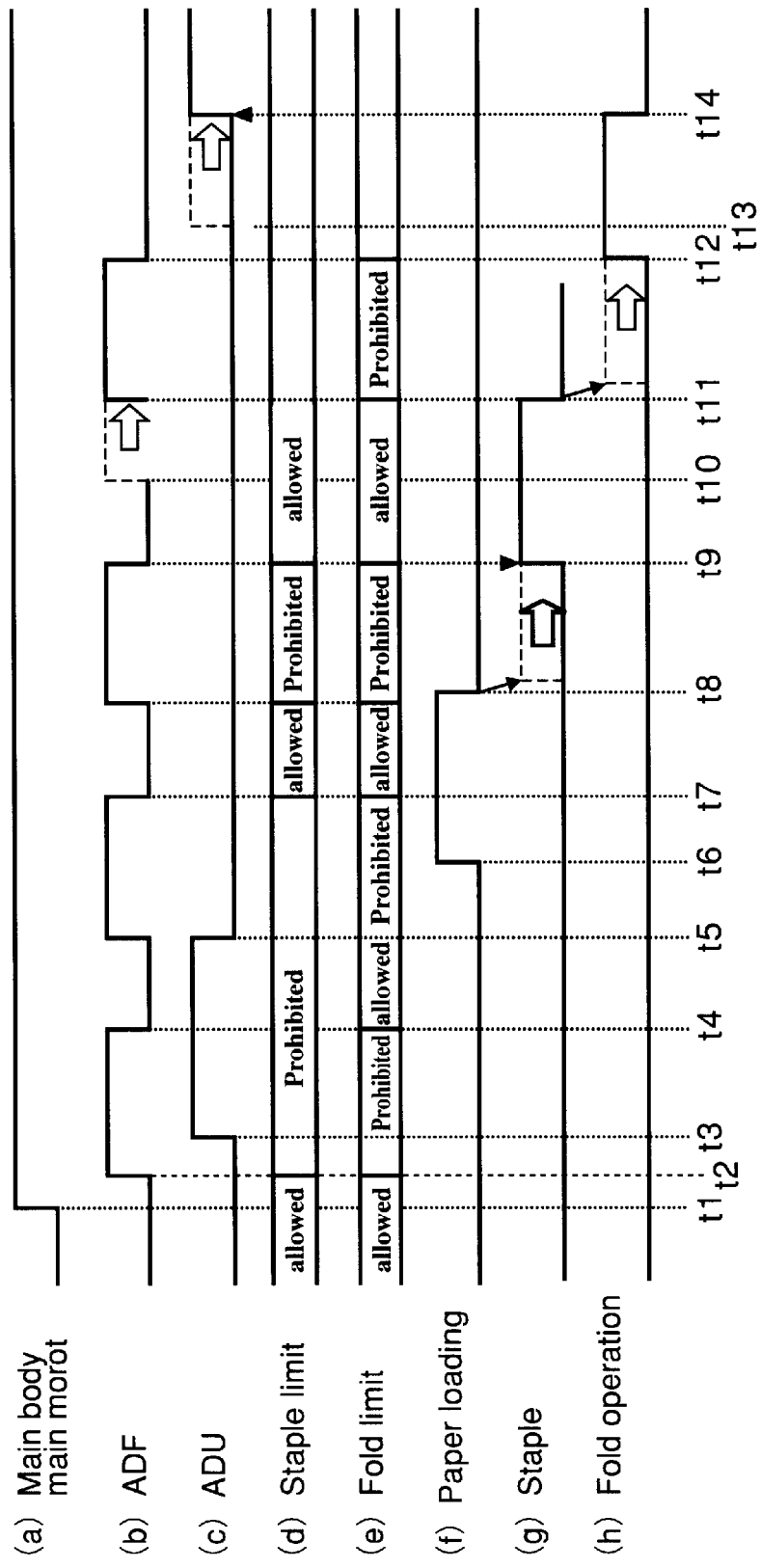
FIG. 9 is a time chart for describing an operation of the image forming apparatus of the present invention.

FIG. 9 is a timing chart that shows timing of the operations mentioned above. As shown in (a), a main motor of the main body section 10 is switched ON at the time t1. Next, as shown in (b), when the ADF operation becomes ON at the time t2, the electric power usage increases. Accordingly, the staple operation and folding operation are prohibited, as shown in (d) and (e). During this time, since the ADU operation is allowed, the ADU operation is switched ON at the time t3. When the ADF operation becomes OFF at the time t4, the folding operation is allowed to start. At the time T5, the ADF operation becomes ON again and the ADF operation becomes OFF. Then the folding operation is prohibited again. When the ADF operation becomes OFF at the time t7, the staple operation and the folding operation are allowed.

During this, the collating operation starts at the time t6 for preparation of the saddle stitch. When the collating operation ends at the time t8, it is time for stapling (i.e., the stapling operation is ready). However, when the ADF operation becomes ON at t8, the staple operation and the folding operation become prohibited. Accordingly, the staple operation does not start even though it is the stapling timing, i.e., the stapling operation is ready, as shown in (g). The staple operation starts when the ADF operation finishes at the time t9, and thus, the staple operation and the folding operation are allowed. In other words, start of the staple operation is postponed from t8 to t9.

When ADF operation is to be ON at t10, since the staple operation is ON, start of the ADF operation is postponed til the end of the staple operation t11. At the time t11, when the staple operation ends, it is the timing of the folding operation (i.e., the folding operation is ready). However, because the ADF operation is ON, the folding operation is postponed until the end of the ADF operation t12. When the ADU operation of the next copy is to be ON at t13, since the folding operation in ON, the ADU operation is postponed until the end of the folding operation t14.

FIG. 10 shows an example of an operation for describing the capability of suppressing the operation electric power to a small value by the above-described postponing process. In other words, when the ADF operation and the staple operation or the ADF operation are processed in parallel, the electric power usage exceeds the operation limit electric power as shown in FIG. 10(a). However, by postponing the execution of the staple operation and the ADU operation, the electric power usage can be suppressed under the operation limit electric power, as shown in FIG. 10(b).

Thus, when more than two operations/functions (processes) are instructed to be performed in parallel and the total electric power usage exceeds the upper limit electric power of the power supply, since one of the processes is given priority in execution and the remaining processes are executed after the end of the priority process, it is not necessary to increase the electric power capacity or to install extra electric power supply.

As described in detail above, according to the present invention, when execution of plural operations/functions(processes) are instructed to the image forming apparatus, such as a copy machine, a facsimile machine, a printer and, an integrated (multifunctional) apparatus and the total electric power usage of the processes exceeds the upper limit electric energy of the power supply, one of the processes is given priority in execution and the remaining processes are executed after the end of the priority process. As a result, it is not necessary to increase the electric power capacity of the apparatus or to install an extra electric power supply.

Further, processes other than the processes in which the total operations/functions use an electric power larger than the upper limit electric power capacity of the power supply are executed in parallel, so that the electric power usage is within a preset electric power based on the electric power usage of each function (operation). Accordingly, it is possible to cope with increase of requested functions, without increasing the electric power capacity or without adding a special electric power supply. Furthermore, delay of the end of the functions (processes) can be made minimum, because plural functions/operations (processes) are executed in parallel.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present disclosure relates to subject matter contained in priority Japanese Application No. 2000-381894, filed on Dec. 15, 2000, which is herein expressly incorporated by reference in its entirety.

What is claimed is:

1. An image forming apparatus comprising:

a power supply that supplies an electric power equal to or less than a predetermined amount of the electric power;

a first function that is a process before a printed paper is obtained and uses a first electric power;

a second function that is a process performed after the printed paper is obtained and uses a second electric power;

a controller that, when the first function and the second function are instructed to be processed in parallel, compares a sum of the first electric power and the second electric power with the predetermined amount of the electric power; and the controller delaying one of the first function and the second function, when the sum of the first electric power and the second electric power exceeds the predetermined amount of the electric power.

2. The image forming apparatus according to claim 1, wherein the controller performs the first function and the second function in parallel, when the sum of the first electric power and the second electric power does not exceed the predetermined amount of the electric power.

3. The image forming apparatus according to claim 1, wherein the first function includes an automatic document feeding function, which sends an original from an original holder to an original reading surface, and removes the original from the original reading surface to an outlet, and a double-sided recording paper feeding function, which automatically turns a recording paper over to perform a double-sided recording, and wherein the second function includes collation of the printed papers, stapling of the printed papers, folding of the printed papers, and outputting of the printed papers.

4. The image forming apparatus according to claim 3, wherein, the double-sided recording paper feeding function as the first function is performed in parallel with one of the folding and outputting of the printed papers as the second function.

5. The image forming apparatus according to claim 3, wherein, when the automatic document feeding function is performed as the first function, none of the second functions is not performed in parallel.

6. The image forming apparatus according to claim 1, wherein, the image forming apparatus comprises at least one of a copying machine, a facsimile machine and a printing machine.

7. An image forming apparatus comprising:

a power supply that supplies an electric power equal to or less than a predetermined amount of the electric power;

a first function that is performed before a printed paper is obtained and uses a first electric power;

a second function that is performed after the printed paper is obtained and comprises a plurality of processes sequentially performed;

a controller that, when the first function and the second function are instructed to be processed in parallel, compares a sum of the first electric power and a second electric power used by a selected one of the plurality of processes and the predetermined amount of the electric power; and the controller delaying one of the first function and the selected one of the plurality of processes, when the sum of the first electric power and the second electric power exceeds the predetermined amount of the electric power.

* * * * *